United States Patent
Shih et al.

(10) Patent No.: US 8,000,498 B2
(45) Date of Patent: Aug. 16, 2011

(54) MOVING OBJECT DETECTION APPARATUS AND METHOD

(75) Inventors: Ming-Yu Shih, Taoyuan (TW); Ying-Ying Chao, Kaohsiung (TW)

(73) Assignee: Industrial Research Institute, Hsinchu (TW)

( * ) Notice: Subject to any disclaimer, the term of this patent is extended or adjusted under 35 U.S.C. 154(b) by 798 days.

(21) Appl. No.: 12/100,396

(22) Filed: Apr. 9, 2008

(65) Prior Publication Data

US 2009/0161911 A1    Jun. 25, 2009

(30) Foreign Application Priority Data

Dec. 21, 2007    (TW) ................. 96149399 A

(51) Int. Cl.
  *G06K 9/00*    (2006.01)
(52) U.S. Cl. ........ 382/103; 382/128; 382/153; 382/209; 382/293; 348/94; 348/143; 348/169; 348/208.1
(58) Field of Classification Search .......... 382/103–107, 382/128–132, 153–154, 209–217, 293–294; 348/94–95, 143–161, 169–172, 208.1–208.16
See application file for complete search history.

(56) References Cited

U.S. PATENT DOCUMENTS

| | | | | |
|---|---|---|---|---|
| 4,937,878 A * | 6/1990 | Lo et al. | ......... | 382/103 |
| 5,150,426 A * | 9/1992 | Banh et al. | ......... | 382/103 |
| 5,212,547 A | 5/1993 | Otsuki | ......... | 358/105 |
| 5,386,480 A * | 1/1995 | Lo et al. | ......... | 382/103 |
| 5,473,364 A | 12/1995 | Burt | ......... | 348/47 |
| 5,566,251 A * | 10/1996 | Hanna et al. | ......... | 382/284 |
| 5,923,791 A * | 7/1999 | Hanna et al. | ......... | 382/295 |
| 5,974,158 A * | 10/1999 | Auty et al. | ......... | 382/103 |
| 5,987,345 A * | 11/1999 | Engelmann et al. | ......... | 600/407 |
| 5,991,428 A | 11/1999 | Taniguchi | ......... | 382/107 |
| 5,999,635 A * | 12/1999 | Higashikubo et al. | ......... | 382/104 |
| 6,134,353 A * | 10/2000 | Makram-Ebeid | ......... | 382/259 |
| 6,188,778 B1 * | 2/2001 | Higashikubo et al. | ......... | 382/104 |
| 6,434,254 B1 * | 8/2002 | Wixson | ......... | 382/103 |
| 6,594,378 B1 * | 7/2003 | Li et al. | ......... | 382/128 |
| 6,757,415 B1 * | 6/2004 | Rogers et al. | ......... | 382/130 |
| 6,788,809 B1 * | 9/2004 | Grzeszczuk et al. | ......... | 382/154 |
| 6,867,799 B2 | 3/2005 | Broemmelsiek | ......... | 348/169 |
| 6,940,998 B2 * | 9/2005 | Garoutte | ......... | 382/103 |
| 6,985,179 B2 * | 1/2006 | Martins et al. | ......... | 348/227.1 |
| 7,020,305 B2 * | 3/2006 | Liu et al. | ......... | 382/107 |
| 7,024,054 B2 * | 4/2006 | Cahill et al. | ......... | 382/294 |
| 7,039,219 B2 * | 5/2006 | Liu et al. | ......... | 382/107 |

(Continued)

OTHER PUBLICATIONS

P. Spagnolo, T.D' Orazio, M. Leo, and A. Distante, "Moving object segmentation by background subtraction and temporal analysis," Image Vision Computing, vol. 24, pp. 411-423, 2006.

(Continued)

*Primary Examiner* — Manav Seth

(57) ABSTRACT

Disclosed is directed to a moving object detection apparatus and method. The apparatus comprises an image capture module, an image alignment module, a temporal differencing module, a distance transform module, and a background subtraction module. The image capture module derives a plurality of images in a time series. The image alignment module aligns the images if the image capture module is situated on a movable platform. The temporal differencing module performs temporal differencing on the captured images or the aligned images, and generates a difference image. The distance transform module transforms the difference image into a distance map. The background subtraction module applies the distance map to background subtraction technology and compares the results with the current captured image, so as to obtain the information for moving objects.

15 Claims, 9 Drawing Sheets

U.S. PATENT DOCUMENTS

| | | | | |
|---|---|---|---|---|
| 7,123,745 | B1 | 10/2006 | Lee | 382/103 |
| 7,127,083 | B2 * | 10/2006 | Han et al. | 382/103 |
| 7,227,893 | B1 | 6/2007 | Srinivasa et al. | 375/240 |
| 7,260,253 | B2 * | 8/2007 | Rahn et al. | 382/131 |
| 7,477,761 | B2 * | 1/2009 | Kondo et al. | 382/107 |
| 7,783,118 | B2 * | 8/2010 | Zhou | 382/236 |
| 2004/0264806 | A1 * | 12/2004 | Herley | 382/284 |
| 2005/0010108 | A1 * | 1/2005 | Rahn et al. | 600/425 |
| 2007/0071357 | A1 * | 3/2007 | Rahn et al. | 382/275 |
| 2008/0278584 | A1 * | 11/2008 | Shih et al. | 348/169 |
| 2009/0022366 | A1 * | 1/2009 | Hampapur et al. | 382/103 |
| 2010/0007764 | A1 * | 1/2010 | Martins et al. | 348/222.1 |
| 2010/0074472 | A1 * | 3/2010 | Garoutte | 382/103 |
| 2010/0296704 | A1 * | 11/2010 | Hampapur et al. | 382/103 |

OTHER PUBLICATIONS

S. M. Desa and Q. A. Salih, "Image subtraction for real time moving object extraction," in Proceedings of the International Conference on Computer Graphics, Imaging and Visualization, pp. 41-45, 2004.

A. Talukder and L. Matthies, "Real-time detection of moving objects from moving vehicles using dense stereo and optical flow," in *IEEE Conference on Intelligent Robots and Systems*, Sendai, Japan, Sep. 2004.

A. Talukder, S. Goldberg, L. Matthies, and A. Ansar, "Real-time detection of moving objects in a dynamic scene from moving robotic vehicles," in *IEEE Conference on Intelligent Robots and Systems*, Las Vegas, NV, Oct. 2003.

Y. Ren, C.-S. Chua, and Y.-K. Ho, "Motion detection with nonstationary background," Machine Vision and Applications, vol. 13, pp. 332-343, 2003.

J.-M. Odobez and P. Bouthemy, "Robust multiresolution estimation of parametric motion models," *Journal of Visual Communication and Image Representation*, vol. 6, No. 4, pp. 348-365, Dec. 1995.

Y. Kameda and M. Minoh, "A human motion estimation method using 3-successive video frames," in *ICCV*, pp. 255-261, 1999.

* cited by examiner

MOVING OBJECT DETECTION APPARATUS AND METHOD

FIELD OF THE INVENTION

The present invention generally relates to a moving object detection apparatus and method.

BACKGROUND OF THE INVENTION

Moving object detection plays an important role in automatic surveillance systems. Surveillance systems detect abnormal security events by analyzing the trajectory and behavior of moving objects in an image, and notify the related security staff. The development of the security robots moves towards the intelligent security robots with abnormal event detection capability to support dynamic deployment and repetitive, continuous surveillance. The moving object detection aims to replace the passive recording widely used in conventional surveillance systems.

For example, US. Pat. No. 6,867,799 disclosed a method and apparatus for object surveillance with a movable camera, including the construction of a surveillance mechanism of maintaining a moving object of interest within the filed of view of a movable camera in an object surveillance system. According to the selected object of interest, the camera movement commands are created so that the object of interest remains in the field of the view of the camera. U.S. Pat. No. 7,123,745 disclosed a method and apparatus for detecting moving objects in video conferencing and other applications. From the continuous video images of a fixed camera, the difference image technique is used to detect moving person and the position and the size of the head of the person are identified.

U.S. Pat. No. 5,991,428 disclosed a moving object detection apparatus and method, including a foreground moving object detection technique applicable to a platform with a movable camera. By image segmentation, template matching and evaluation and voting, the disclosed patent estimates the moving vector of the corresponding areas of the neighboring images. Based on the dominant moving vector of the image, the align vector between the neighboring images is determined. Based on the align vector, one of the two neighboring images is shifted for alignment and difference comparison to identify the moving object area. U.S. Pat. No. 5,473,364 disclosed a video technique for indicating moving objects from a movable platform. Assuming that the images captured by the front and rear cameras at two consecutive times have only a slight difference, the disclosed patent aligns the images from the front camera and subtracts from the image from the rear camera, and then uses Gaussian pyramid construction to compute the area energy to detect the moving objects and obtains more stable moving object profiles.

However, image-based moving object detection technique deployed on a fixed camera usually cannot provide dynamic security support. In a restricted surveillance area, the surveillance is often ineffective. On the other hand, for movable camera surveillance, the movement of the camera will cause the entire image change and the compensation to the error caused by the camera movement makes it difficult to use a single image-based technique to effectively detect moving objects.

FIGS. 1 and 2 show the moving object detection methods, which integrate background subtraction and consecutive image difference, proposed by Desa and Spagnolo in 2004 and 2006 respectively. The background subtraction is to consider the background of an area in foreground detection, and the consecutive image difference is to find the difference in a plurality of consecutive images to detect moving parts. However, in the techniques depicted in FIGS. 1 and 2, the background subtraction and consecutive image difference are solely integrated computationally. Therefore, only the outer profile of moving objects can be detected, while the inner area of the entire moving objects cannot be detected.

SUMMARY OF THE INVENTION

The disclosed exemplary embodiments according to the present invention may provide an apparatus and method for detecting moving objects. The information of the detected moving objects at least includes the region where the moving objects occur.

In an exemplary embodiment, the disclosed is directed to a moving object detection apparatus, comprising: an image capture module, an image alignment module, a temporal differencing module, a distance transform module, and a background subtraction module. The image capture module derives a plurality of images in a time series. The image alignment module aligns the images if the image capture module is situated on a movable platform. The temporal differencing module performs temporal differencing on the captured images or the aligned images, and generates a difference image. The distance transform module transforms the difference image into a distance map. The background subtraction module applies the distance map to background subtraction technology and compares the results with the current captured image, so as to obtain the information for moving objects.

In another exemplary embodiment, the disclosed is directed to a moving object detection method, comprising: capturing images at different times; aligning the images at different times if on a movable platform; applying temporal differencing on captured or aligned images to generate a difference image; transforming the difference image into a distance map; and applying the distance map to the background subtraction technology and comparing the results with an current captured image to obtain the moving object information.

The disclosed exemplary embodiments according to the present invention may be applied to a platform with a movable camera for detecting moving objects in real-time. By using temporal differencing to obtain distance map for enhancing the background subtraction technique, the present invention is also applicable to a fixed camera platform to improve the reliability of moving object detection.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

In the disclosed exemplary embodiments of the present invention, the images captured by the movable camera are first compensated by the image analysis for the background changed caused by the camera movement. Then, the temporal differencing, distance transformation, and background subtraction techniques are combined to detect the moving object regions in a stable manner.

Figure 1:
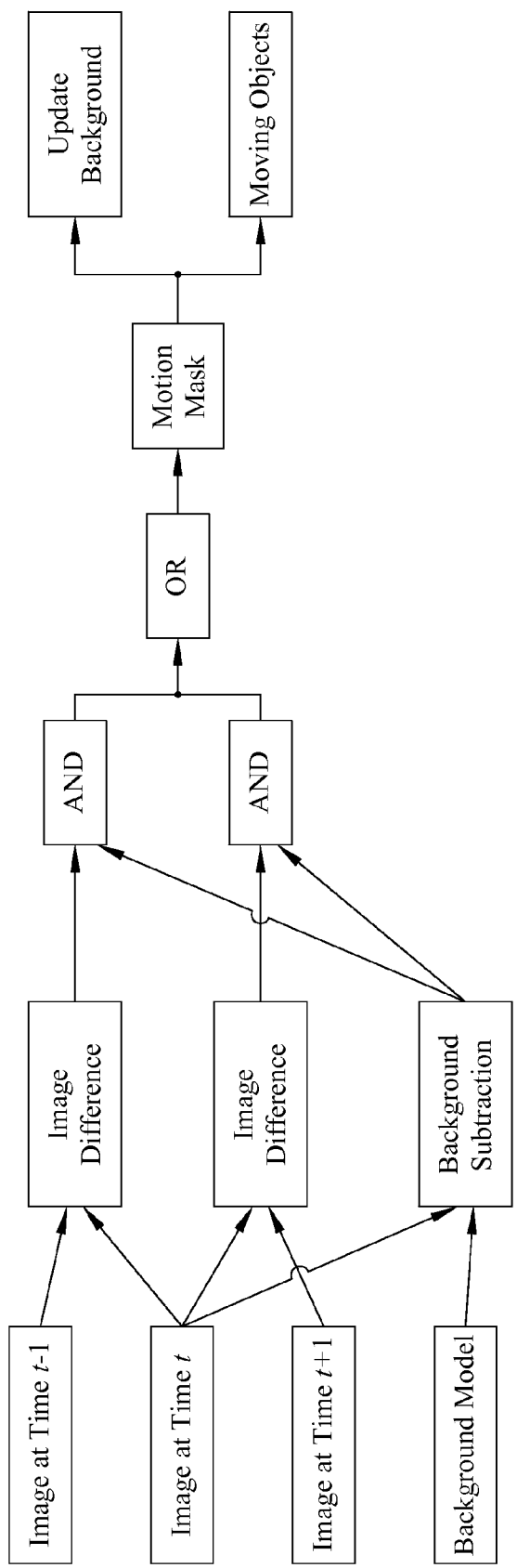
FIG. 1 shows an exemplary schematic view of combining background subtraction and temporal differencing for moving object detection.
Figure 2:
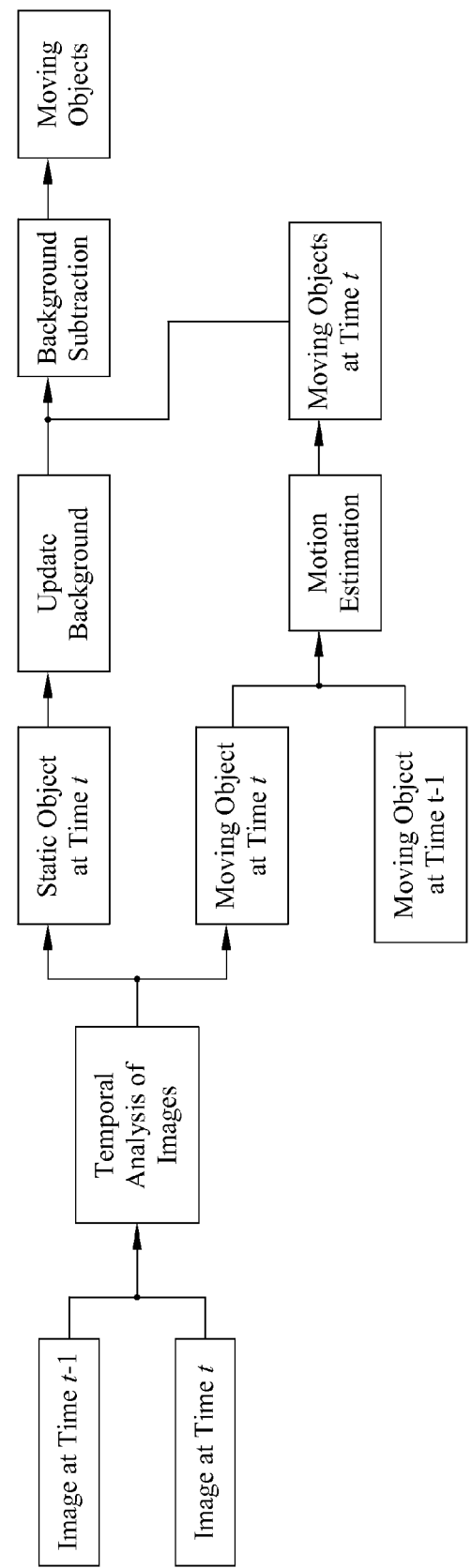
FIG. 2 shows another exemplary schematic view of combining background subtraction and temporal differencing for moving object detection.
Figure 3:
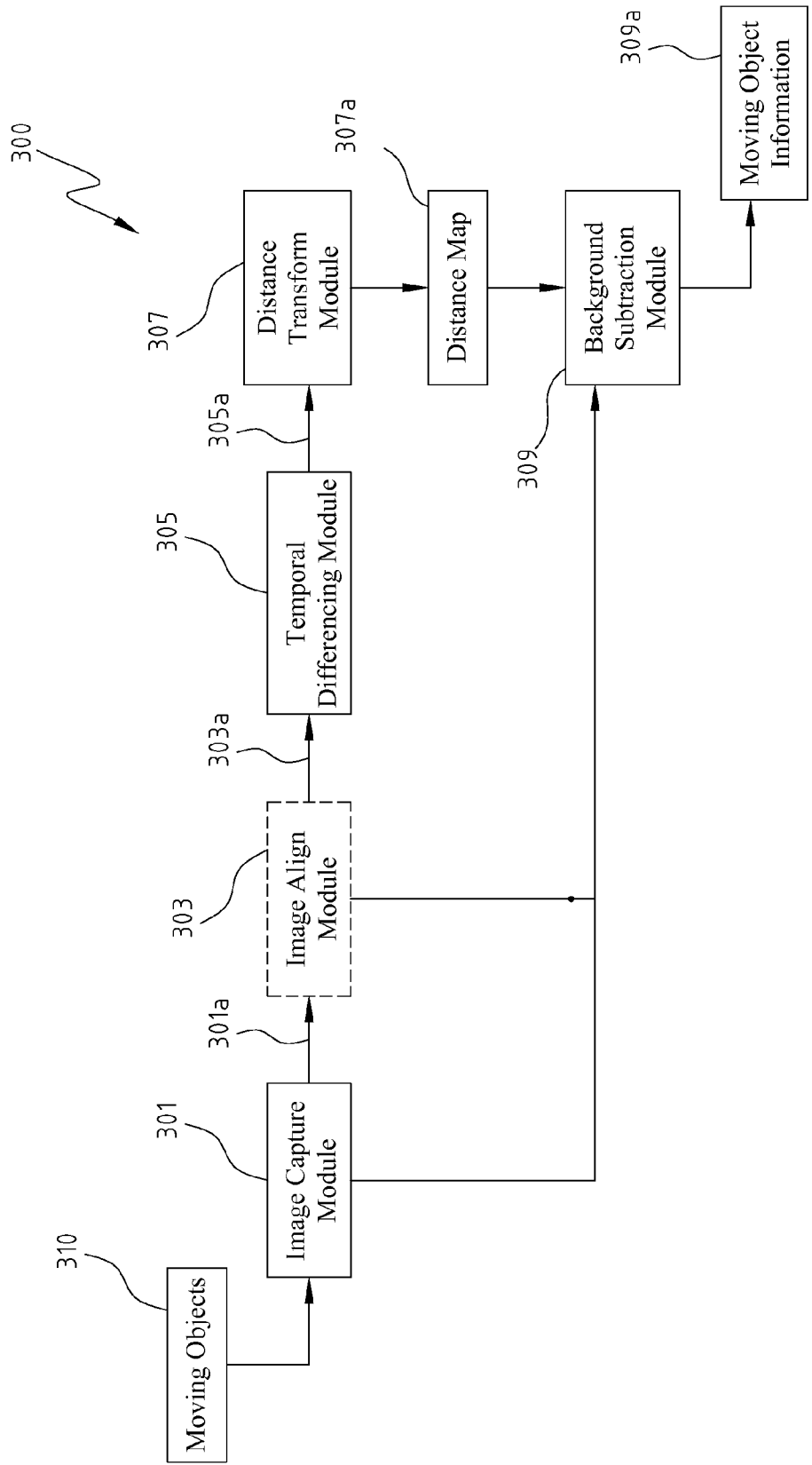
FIG. 3 shows a schematic view of an exemplary moving object detection apparatus, consistent with certain disclosed embodiments.

FIG. 3 shows a schematic view of an exemplary moving object detection apparatus, consistent with certain disclosed embodiments. Referring to FIG. 3, the exemplary moving object detection apparatus 300 may comprise an image capture module 301, an image alignment module 303, a temporal differencing module 305, a distance transform module 307, and a background subtraction module 309.

Image capture module 301 captures images for moving objects 310 at different times. If image capture module 301 is on a movable platform, image align module 303 aligns the images captured at different times. The aligned images are marked as 303a. Temporal differencing module 305 performs temporal differencing on the captured or aligned images to obtain a difference image 305a. Distance transform module 307 transforms difference image 305a into a distance map 307a. Background subtraction module 309 applies distance map 307a to a background subtraction technology and compares to the current captured image to obtain a final detection result for moving objects; that is, moving object information 309a.

In the case of a movable platform, image align module 303 may provide aligned images 303a to temporal differencing module 305 for reference and provide alignment parameters to background subtraction module 309 for reference. In the case of a static platform, no image alignment is required. Therefore, on a static platform, moving object detection apparatus 300 need not include an image align module 303, and background subtraction module 309 does not require alignment parameters for input.

Figure 4:
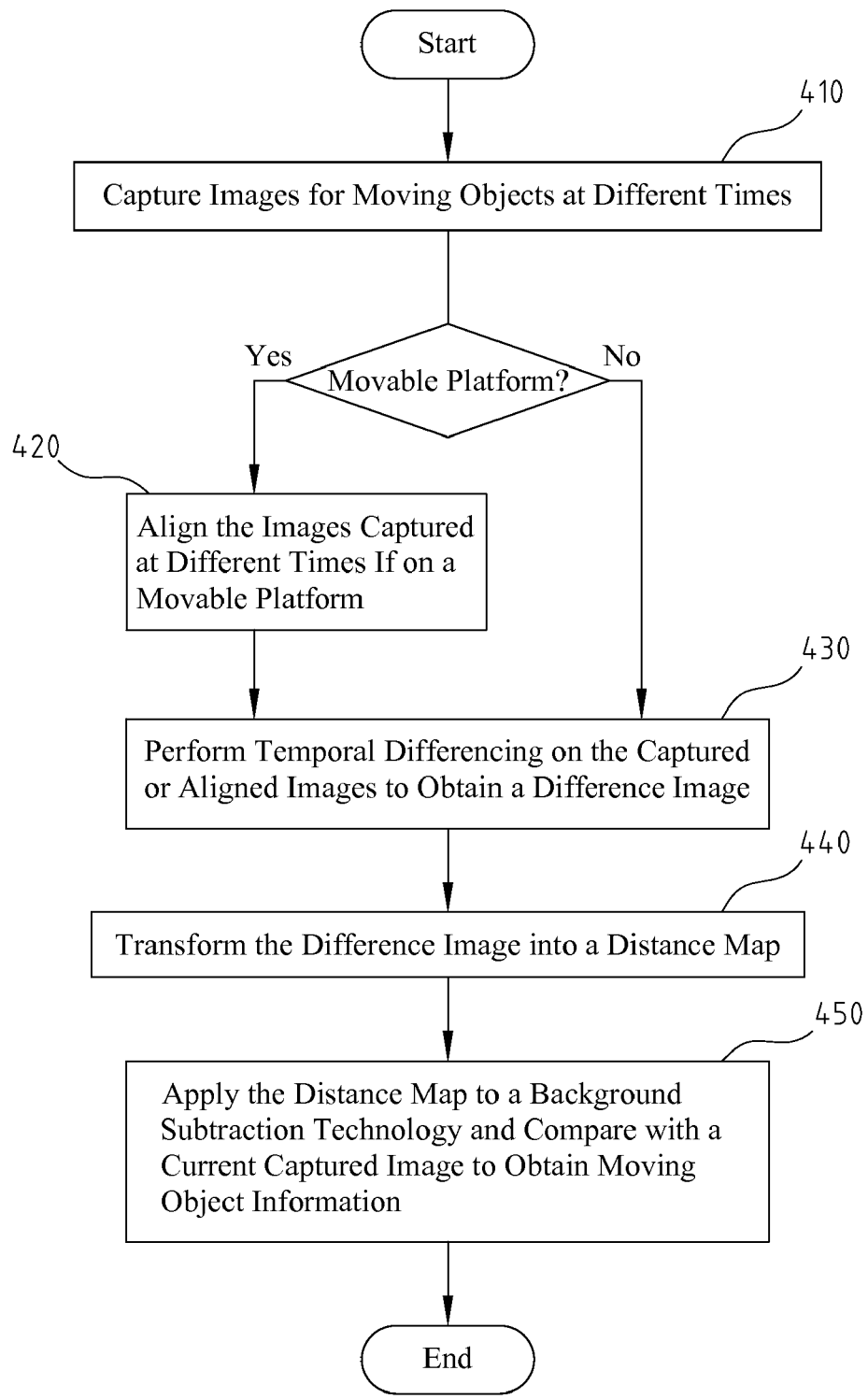
FIG. 4 shows an exemplary flowchart of a moving object detection method, consistent with certain disclosed embodiments.

FIG. 4 shows an exemplary flowchart of a moving object detection method, according to the exemplary apparatus of FIG. 3, consistent with certain disclosed embodiments. Referring to FIG. 4, step 410 is to capture images for moving objects at different times. If image capture module 301 is on a moveable platform, step 420 is to align images 301a captured at different times to obtain an aligned image 303a. In step 430, temporal differencing technology is performed on aligned image 303a to obtain difference image 305a. On the other hand, if image capture module 301 is on a static platform, step 430 is to perform differencing technology directly on captured images at different times to obtain difference image 305a. Therefore, as shown in step 430, temporal differencing technology is performed on captured images 301a or aligned images 303a to obtain difference image 305a.

In step 440, distance transform is performed on difference image 305a into a distance map 307a. The distance map 307a is applied to the background subtraction technology and compared with the current captured image to obtain the moving object information, as shown in step 450. The moving object information may include the marking of the area of the moving object, such as foreground pixels. In step 450, the alignment parameters are also used to align the background model to the current captured image to obtain the moving object information.

Figure 5:
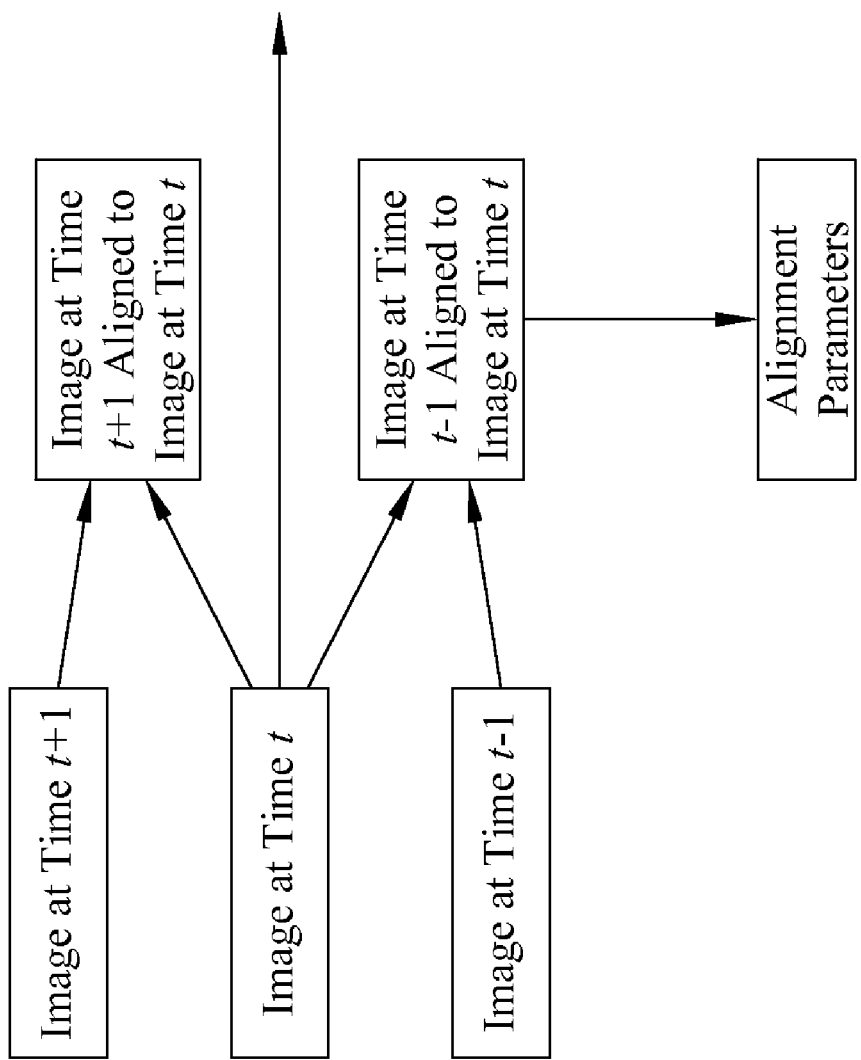
FIG. 5 shows an exemplary schematic view of performing image alignment, consistent with certain disclosed embodiments.

In the exemplary embodiment of FIG. 3, image capture module 301 may capture a series of continuous images 301a at different times by a camera on a movable or static platform through moving objects in a scene. According to the background of the continuous images captured at different times, image align module 303 may obtain alignment parameters for aligning the background of these continuous images captured on a movable platform at different times. As shown in FIG. 5, the alignment parameters may be obtained from two of the three continuous images $F_{t-1}$, $F_t$, $F_{t+1}$ captured at times t−1, t, and t+1, and to align both images $F_{t-1}$, $F_{t+1}$ to $F_t$ to eliminate the image change caused by the movable camera.

In the disclosed exemplary embodiments, several background compensation technologies may be used, for example, multi-resolution estimation of parametric motion models, which is a technology using Gaussian low-pass filter to establish multi-resolution image pyramid, and then estimating the motion parameters between two neighboring images by using the least mean square error (LMSE) analysis to minimize the difference square of two neighboring images on each resolution.

Figure 6:
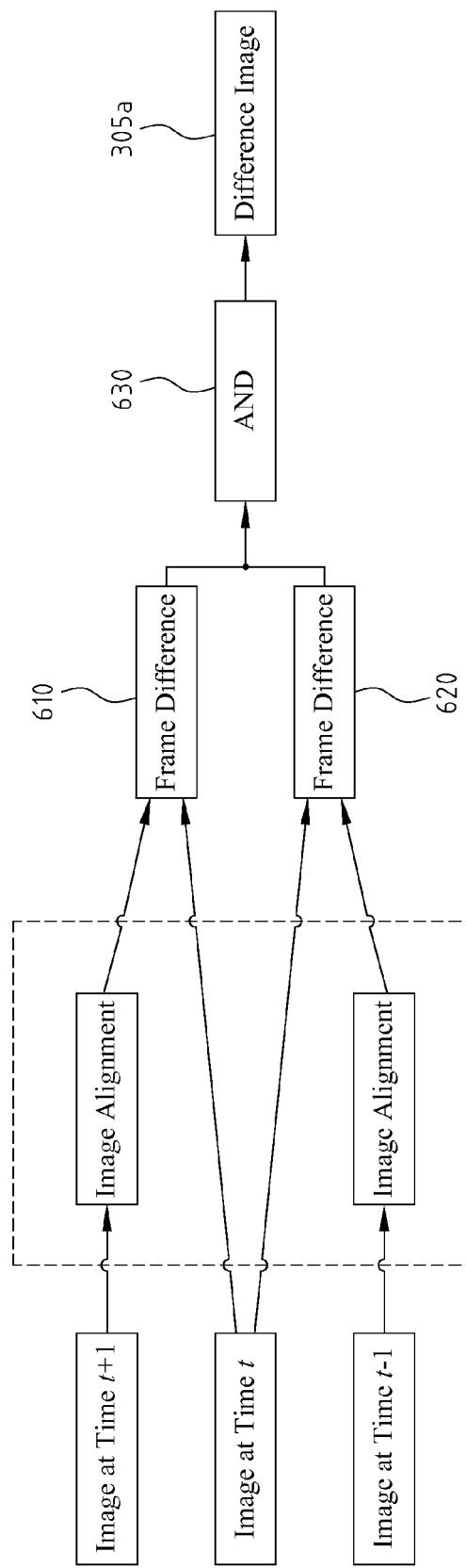
FIG. 6 shows an exemplary schematic view of performing temporal differencing, consistent with certain disclosed embodiments.

FIG. 6 shows an exemplary schematic view of performing temporal differencing, consistent with certain disclosed embodiments. Referring to FIG. 6, after aligning images $F_{t-1}$, $F_{t+1}$ to $F_t$, based on the difference between images $F_{t-1}$, $F_{t+1}$ and $F_t$, two frame differences 610, 620 may be obtained. Using frame differences 610, 620 and an AND operation 630, difference image 305a may be obtained to detect the possible foreground area. That is, temporal differencing module 305 may apply the analysis of the three continuous images to the compensated image to detect the possible foreground of moving objects.

The following shows an example for obtaining the difference image from three continuous images $F_{t-1}$, $F_t$, $F_{t+1}$. Let $X_i$ represent the image location in a scene, and $C(X_i)$ be a representation matrix of $X_i$ that may be multiplied by a motion parameter matrix. Then, after images $F_{t-1}$, $F_{t+1}$ are aligned to $F_t$, two motion parameters $A_{t-1}$, $A_{t+1}$ may be obtained. Using the following equation, two difference frames $FD_{t-1}$, $FD_{t+1}$ may be obtained:

$$FD_k(X_i) = \begin{cases} 1, & \text{abs}(F_t(X_i) - F_k(X_i + C(X_i)A_k^{-1})) < \delta_1 \\ 0, & \text{otherwise}, \end{cases}$$

Where k =t−1, t, t+1, and $\delta_1$ is a threshold value. "AND" operation is applied to processing the difference frames $Fd_{t-1}$, $FD_{t+1}$ to obtain difference image $FA_t$; i.e., $FA_t(X_i) = FD_{t-1}(X_i)^\smallfrown FD_{t+1}(X_i)$.

On the other hand, if the continuous images 301a are captured on a static platform, no alignment is necessary. The captured images may be processed for difference image 305a to detect the possible foreground area of the moving object.

Figure 7:
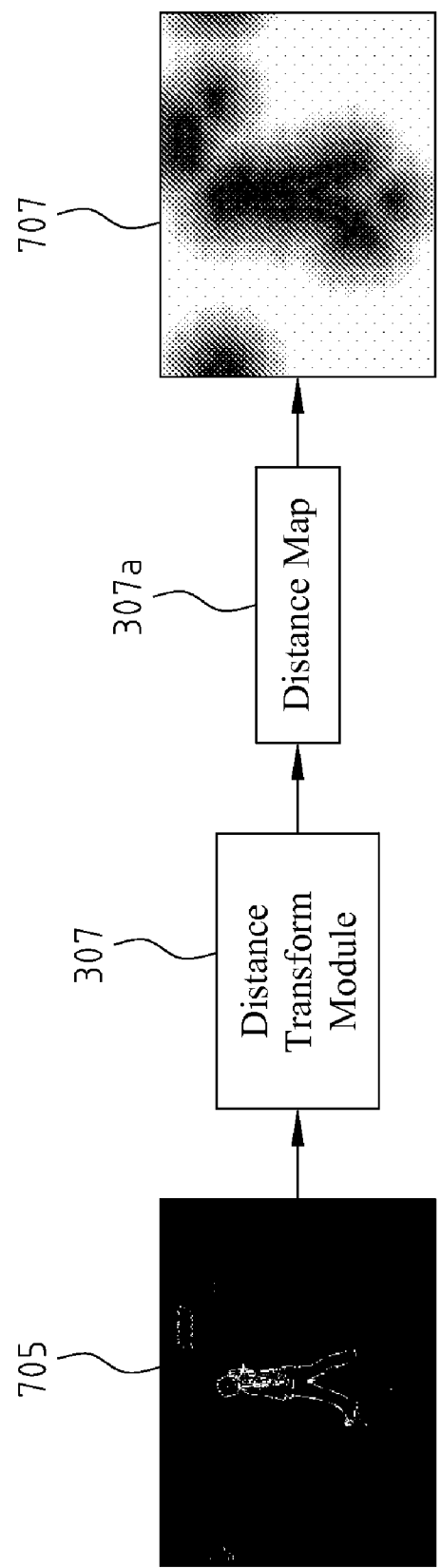
FIG. 7 shows an exemplary schematic view of performing distance transform, consistent with certain disclosed embodiments.

Distance transform module 307 may apply a distance transform technology to transform difference image 305a into a distance map 307a. The distance transform technology, such as the following equation, may transform difference image $FA_t$ into a distance map $D_t$:

$$D_t(X_i) = \frac{\min(\|FA_t(X_i) - FA_t(X_k)\|, \delta_2)}{\delta_2},$$

where $X_k$ is the foreground point closest to $X_i$, and $\delta_2$ is the maximum allowed distance. In other words, each point in distance map $D_t$ is the value of the distance between the point and the closest foreground point divided by the maximum allowed distance. The closer to a foreground the point is, the smaller its value is, which means that the point is more likely to belong to the moving object, and vice versa. FIG. 7 shows an exemplary schematic view of performing distance transform, consistent with certain disclosed embodiments. Referring to FIG. 7, after distance transform on difference image 705, distance map 707 is obtained. Distance map 707 may be seen as a probability distribution of the moving object location. Therefore, from the distance map, the area in which the moving object in a scene may be seen, and the stability of the moving object detection may be improved.

Figure 8:
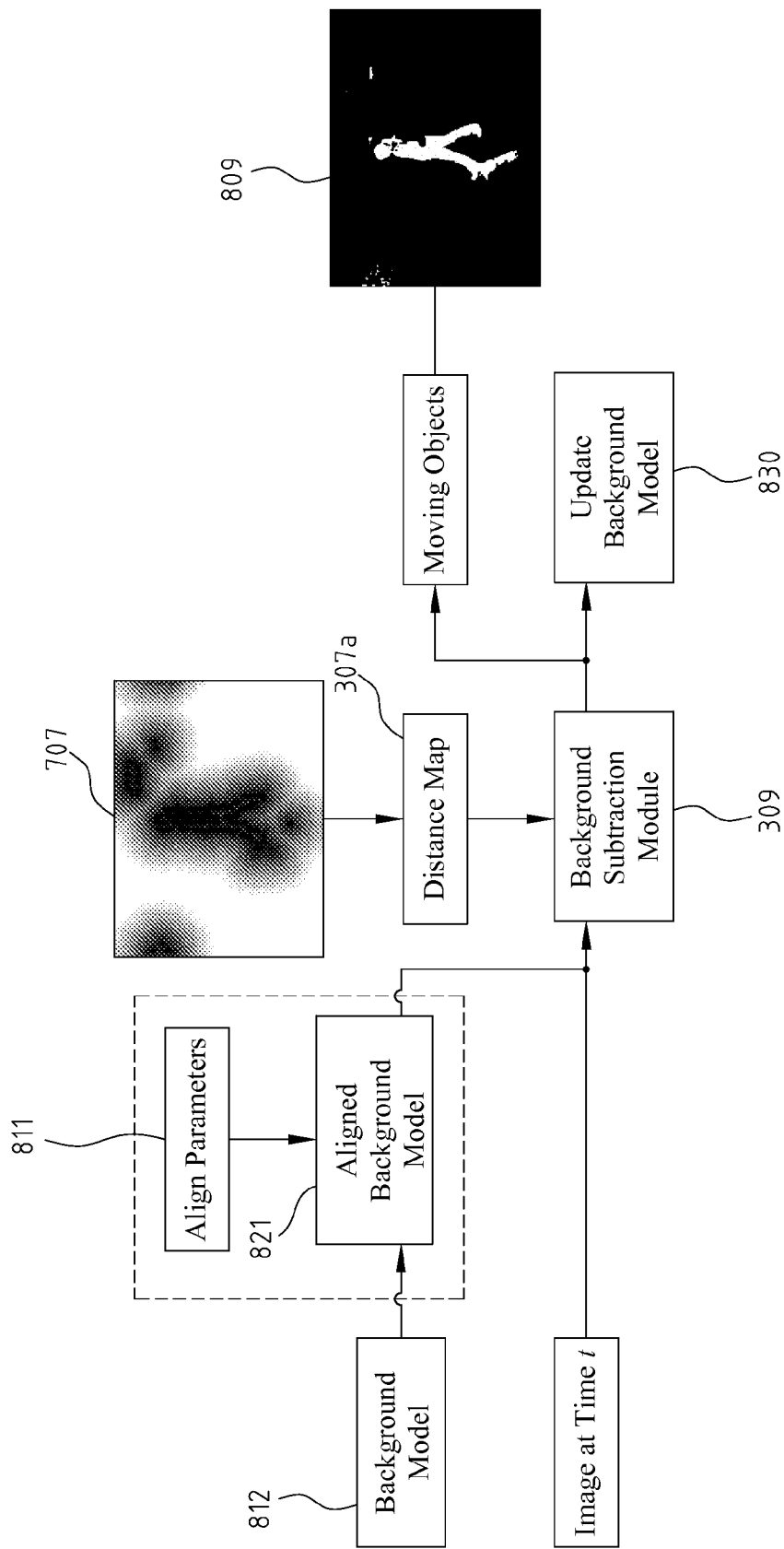
FIG. 8 shows an exemplary view of performing background subtraction, consistent with certain disclosed embodiments.

Background subtraction module 309 applies distance map to the background subtraction technology, and compares with the current capture image to obtain the moving object information. FIG. 8 shows an exemplary view of performing background subtraction, consistent with certain disclosed embodiments. Referring to FIG. 8, background subtraction module 309 applies alignment parameters 811 to background model 812 to align the background to the current captured image. Aligned background model 821 and image at time t use distance map, such as 707, as an updating rate to update background model, as shown in 830. Also, aligned background model 821 having the weight of distance map 707 is compared with the image captured at time t to perform foreground detection at time t for detecting moving objects, such as 809.

In the foreground detection stage, because of the background alignment error, a region of background pixels may be used for foreground detection. The result of the distance transform of the continuous images, i.e., distance map $D_t$ may be used as an adaptive threshold value for foreground detection. The higher the probability of being in foreground is, the lower the threshold value will be; and vice versa. When the background is updated, distance map $D_t$ may be used as adaptive updating rate. The higher the probability of being in foreground is, the background is not updated; and vice versa.

Because background subtraction module 309 uses distance map $D_t$ as the basis of parameter tuning in applying distance map to the background subtraction technology for foreground detection and background updating at time t, the obtained moving object information not only includes the outer shape of moving objects, but also the internal area of moving objects.

Figure 9:
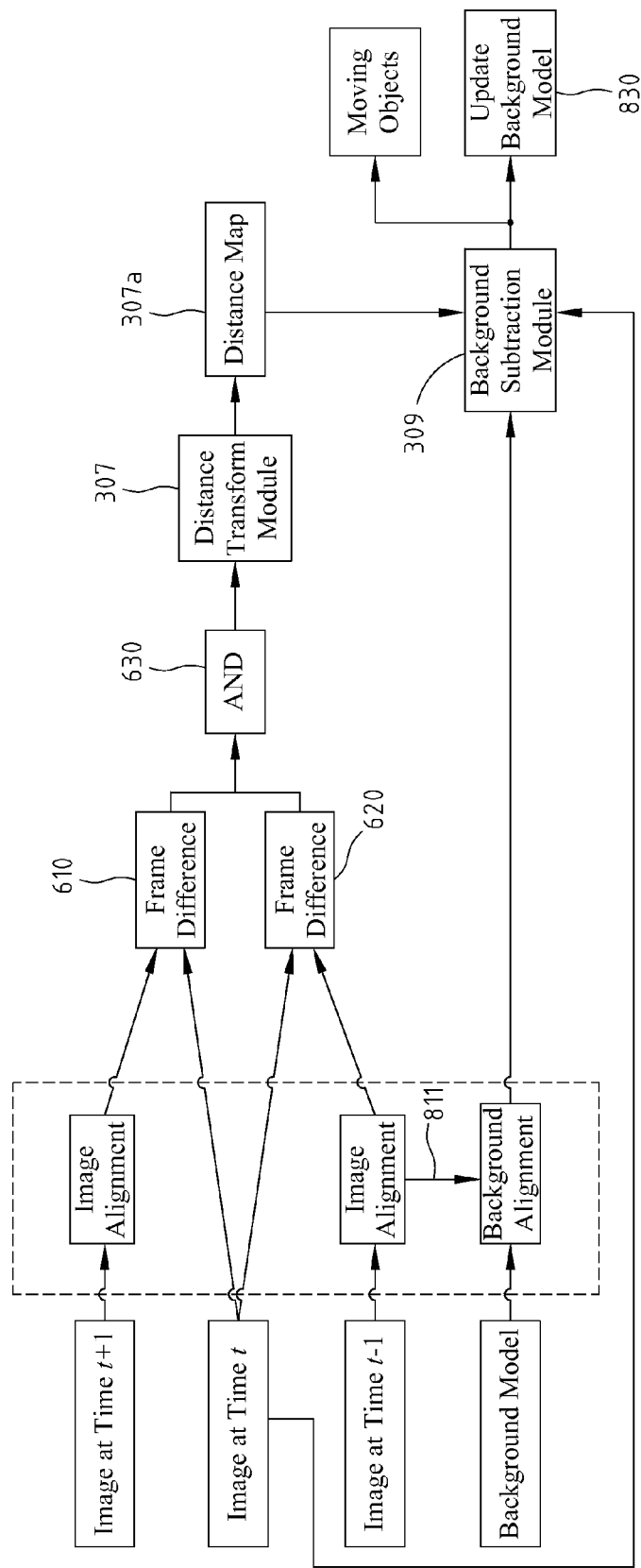
FIG. 9 shows an exemplary schematic view of integrating FIG. 5-FIG. 8, consistent with certain disclosed embodiments.

FIG. 9 shows an exemplary schematic view of integrating FIG. 5-FIG. 8, consistent with certain disclosed embodiments. From FIG. 9 and the previous description, the disclosed exemplary embodiments according to present invention compensate for the image shift caused by a movable platform, and combine background subtraction with temporal differencing technologies in applying the distance map obtained by temporal differencing and distance transform for background subtraction to stably detect the foreground moving object area.

In the disclosed exemplary embodiments of the present invention, temporal differencing technology is used to assist the background subtraction technology to detect foreground object after compensating the background caused by background shift. This achieves the objective of using a single camera in effective moving object detection. The disclosed exemplary embodiments of the present invention also use distance transform technology to transform the temporal differencing result into a distance map that can be seen as a probability distribution for the current location of objects and may be applied to the background subtraction as a good weighting function for foreground detection and background updating.

In foreground detection, the weight on moving object area is increased and in background updating, the weight of moving object area is reduced so that the moving object may be detected more easily. In this manner, the present invention may improve the conventional background subtraction technology to detect a moving object more stably. The temporal differencing mechanism used in the disclosed exemplary embodiments of the present invention not only is applicable to the movable platform, but also to the fixed platform to improve the moving object detection stability.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A moving object detection apparatus, comprising:
    an image capture module that captures a plurality of images for one or more moving objects at different times;
    an image align module that aligns said plurality of images captured at different times if said image capture module is situated on a movable platform;
    a temporal differencing module that performs temporal differencing on said captured or aligned images to obtain a difference image;
    a distance transform module that transforms said difference image into a distance map; and
    a background subtraction module that applies said distance map to a background subtraction technology and compares with a current captured image to obtain moving object information.

2. The apparatus as claimed in claim 1, wherein in a movable platform, said image align module provides one or more alignment parameters to said background subtraction module to obtain said moving object information.

3. The apparatus as claimed in claim 1, wherein in a movable platform, said image align module provides said aligned images to said temporal differencing module.

4. The apparatus as claimed in claim 1, wherein said moving object information at least includes an area where said one or more moving objects occur in the images.

5. The apparatus as claimed in claim 1, wherein said distance map provides a probability distribution of a location for said one or more moving objects.

6. The apparatus as claimed in claim 1, said apparatus is applicable to both movable platform and fixed platform.

7. The apparatus as claimed in claim 6, wherein in a fixed platform, said apparatus does not comprise an image align module.

8. A moving object detection method performed in a moving object detection apparatus, said apparatus having an image capture module, an image align module, a temporal differencing module, a distance transform module, and a background subtraction module, and said method comprising the steps of:

capturing a plurality of images for one or more moving objects at different times using said image capture module;

aligning said plurality of images captured at different times using said image align module if said captured images are on a movable platform;

performing temporal differencing on said captured or aligned images using said temporal differencing module to obtain a difference image;

transforming said difference image into a distance map using said distance transform module; and applying said distance map to a background subtraction technology and comparing with a current captured image using said background subtraction module to obtain moving object information.

9. The method as claimed in claim 8, wherein in a movable platform, at least an alignment parameter is applied to a pair of said captured images for aligning images at different times.

10. The method as claimed in claim 8, wherein said background subtraction technology at least includes:

applying at least an alignment parameter to a background model for said one or more moving objects for aligning said background model to a current captured image;

updating said current captured image into said aligned background model by using said distance map as an updating rate for the background model updating; and comparing the aligned background model with said current captured image by taking said distance map as a weighting function to perform foreground detection at current time for detecting said one or more moving objects.

11. The method as claimed in claim 8, wherein in a movable platform, alignment is performed on neighboring images before temporal differencing to align background area of said neighboring images for compensating image change caused by the movable platform.

12. The method as claimed in claim 8, wherein said temporal differencing technology is to perform an AND operation on two frame differences obtained from deformation transformation to compute said difference image.

13. The method as claimed in claim 8, wherein an area where said one or more moving objects occur in an image is seen from said distance map.

14. The method as claimed in claim 10, wherein in foreground detection, said distance map is used as an adaptive threshold for foreground determination.

15. The method as claimed in claim 10, wherein in background updating, said distance map is used as an adaptive updating rate.

\* \* \* \* \*

UNITED STATES PATENT AND TRADEMARK OFFICE
CERTIFICATE OF CORRECTION

| | | |
|---|---|---|
| PATENT NO. | : 8,000,498 B2 | |
| APPLICATION NO. | : 12/100396 | |
| DATED | : August 16, 2011 | |
| INVENTOR(S) | : Ming-Yu Shih et al. | |

It is certified that error appears in the above-identified patent and that said Letters Patent is hereby corrected as shown below:

On the Title Page, Item (73)

Name of the Assignee: change "Industrial Research Institute" to
--Industrial Technology Research Institute--

Signed and Sealed this
Thirty-first Day of January, 2012

David J. Kappos
*Director of the United States Patent and Trademark Office*